US010310912B2

(12) United States Patent
Mankovskii et al.

(10) Patent No.: US 10,310,912 B2
(45) Date of Patent: Jun. 4, 2019

(54) ASSIGNING DATA PROCESSING WORKLOADS IN DATA CENTERS BASED ON NON-DATA PROCESSING OVERHEAD

(71) Applicant: CA, INC., Islandia, NY (US)

(72) Inventors: Serguei Mankovskii, Santa Clara, CA (US); Douglas M. Neuse, Austin, TX (US); Ramanjaneyulu Malisetti, Hyderabad (IN); Rajasekhar Gogula, Hyderabad (IN); Subhasis Khatua, Hyderabad (IN)

(73) Assignee: CA, INC., Islandia, NY (US)

( * ) Notice: Subject to any disclaimer, the term of this patent is extended or adjusted under 35 U.S.C. 154(b) by 201 days.

(21) Appl. No.: 14/156,250

(22) Filed: Jan. 15, 2014

(65) Prior Publication Data
US 2015/0199215 A1 Jul. 16, 2015

(51) Int. Cl.
*G06F 9/48* (2006.01)
*G06F 9/50* (2006.01)

(52) U.S. Cl.
CPC .......... *G06F 9/5094* (2013.01); *G06F 9/4893* (2013.01); *Y02D 10/22* (2018.01)

(58) Field of Classification Search
CPC ...... G06F 9/4893; G06F 9/5094; Y02D 10/22
See application file for complete search history.

(56) References Cited

U.S. PATENT DOCUMENTS

| 7,957,948 | B2 | 6/2011 | Zink et al. | |
|---|---|---|---|---|
| 8,631,411 | B1* | 1/2014 | Ghose | G06F 1/206 361/676 |
| 2007/0038414 | A1* | 2/2007 | Rasmussen | G06F 1/206 703/1 |
| 2010/0161368 | A1* | 6/2010 | Dawson | G06F 9/505 705/7.11 |

OTHER PUBLICATIONS

Fan et al. Power Provisioning for a Warehouse-sized Computer. [online] (Jun. 13, 2007). ACM., pp. 1-11. Retrieved From the Internet <http://www3.cs.stonybrook.edu/~anshul/courses/cse691_f14/power_provisioning.pdf>.*

(Continued)

*Primary Examiner* — Emerson C Puente
*Assistant Examiner* — Jonathan R Labud
(74) *Attorney, Agent, or Firm* — Sage Patent Group

(57) ABSTRACT

Data processing workloads are selectively assigned within a data center and/or among data centers based on non-data processing overhead within the data center and/or among the data centers. Power consumption of a rack including servers is predicted based on data processing demands that are placed on the servers for a given data processing workload, and power consumed by the rack is measured when the servers are performing the given data processing workload. A metric of power consumed by the rack for non-data processing overhead is derived based on a difference between results of the predicting and the measuring. A future data processing workload is selectively assigned to the rack based on the metric of power of power consumed by the rack for the non-data processing overhead. Assignment may also take place at an aisle and/or data center level based on these metrics.

18 Claims, 10 Drawing Sheets

(56) References Cited

OTHER PUBLICATIONS

Economou et al. Full-System Power Analysis and Modeling for Server Environments. [online] (2006). Sonoma., pp. 1-8. Retrieved From the Internet <https://sonoma-dspace.calstate.edu/bitstream/handle/10211.1/715/rivoire_full.pdf?sequence=5>.*

Ananchaperumal et al., "Five steps for increasing availability and reducing energy consumption and costs across cloud and virtual platforms", copyright 2012 CA, 12 pp.

Gilbert et al., White Paper—"From Data Center Metrics to Data Center Analytics: How to Unlock the Full Business Value of DCIM", copyright Apr. 2013 CA Technologies, 14 pp.

Glanz, "Power, Pollution and the Internet", downloaded Oct. 21, 2013 from http://www.nytimes.com/2012/09/23/technology/data-centers-waste-vast-amounts-of-energy-belying-industry-image.html?_r=0, 12 pp.

Hyperformix, Inc., "Hyperformix Capacity Manager Data Sheet, Version 5.0", date unknown, 2 pp.

Hyperformix, Inc., "Hyperformix® Capacity Manager™ 5.0.1", copyright 2001-2009 Hyperformix, Inc., 15 pp.

Wikipedia—the free encyclopedia, "Data center", downloaded Nov. 14, 2013 from http://en.wikipedia.org/w/index.php?title=Data_center&printable=yes, 9 pp.

* cited by examiner

ASSIGNING DATA PROCESSING WORKLOADS IN DATA CENTERS BASED ON NON-DATA PROCESSING OVERHEAD

BACKGROUND

Various embodiments described herein relate to computer systems, methods and program products, and more particularly to systems, methods and computer program products for monitoring performance and efficiency of computer servers.

A data center is a facility used to house computer systems and associated components. Data centers are proliferating across the world with the increase in use of technology, such as the Internet, virtualization and cloud computing. A data center can provide advantages, such as hosting large numbers of computers, commonly referred to as "servers", in a small space, which can also provide simplified cabling, a controlled environment (such as air conditioning and fire suppression), redundant or backup power supplies and security. Large data centers are industrial operations that can consume as much electricity as a small town. The primary influencer of this power consumption generally is the server. Thus, as server volumes grow, the overall power consumption of the data center may also continue to grow.

A data center may house many different types of servers, from different manufacturers, using different generations of technology and/or having different capabilities. The layout of Servers in a rack and organization of racks in an aisle varies from data center to data center.

BRIEF SUMMARY

Various embodiments described herein can selectively assign data processing workloads within a data center and/or among data centers based on non-data processing overhead within the data center and/or among the data centers. Specifically, some embodiments described herein predict power consumption of a rack that comprises a plurality of servers based on data processing demands that are placed on the plurality of servers for a given data processing workload and measure power consumed by the rack when the plurality of servers are performing the given data processing workload. A metric of power consumed by the rack for non-data processing overhead is derived based on a difference between results of the predicting and the measuring. A future data processing workload is selectively assigned to the rack based on the metric of power of power consumed by the rack for the non-data processing overhead. In some embodiments, the predicting, measuring and driving are performed for a plurality of racks that include the rack, and the selectively assigning a future data processing workload to the rack comprises selectively assigning the future data processing workload among the plurality of racks including the rack based upon the metrics of power consumed by the plurality of racks for the non-data processing overhead.

Various embodiments described herein also can selectively assign workloads on an aisle level. More specifically, these embodiments perform the predicting, the measuring and the deriving for an aisle that comprises a plurality of racks including the rack, to derive a metric of power consumed by the aisle for the non-data processing overhead that is based on a difference between the results of the predicting and the measuring for the aisle. The future data processing workload is selectively assigned to the aisle based on the metric of power consumed by the aisle for the non-data processing overhead. Moreover, in some embodiments, the predicting, measuring and deriving are performed for a plurality of racks in the aisle that includes the rack, and the selectively assigning the future data processing workload to the aisle comprises selectively assigning the future data processing workloads among the plurality of racks in the aisle based upon the metrics of power consumed by the plurality of racks in the aisle for the non-data processing overhead.

Some embodiments may also selectively assign workload on a data center level by performing the predicting, the measuring and the deriving for a data center that comprises a plurality of aisles including the aisle, to derive a metric of power consumed by the data center for the non-data processing overhead. A future data processing workload is selectively assigned to the data center based on the measure of power consumed by the data center for the non-data processing overhead that is based on a difference between the results of the predicting and the measuring for the data center. Moreover, in some embodiments, the selectively assigning a future data processing workload to the data center comprises selectively assigning the future data processing workload among the plurality of aisles in the data center based upon the metrics of power consumed by the plurality of aisles in the data center for the non-data processing overhead. In still other embodiments, the selectively assigning the future data processing workload to the data center comprises selectively assigning future data processing workloads among a plurality of data centers including the data center based upon the metric of power consumed by the data center for the non-data processing overhead.

In any of the above described embodiments, the selectively assigning the future data processing workload may further comprise assigning the future data processing workload among the plurality of racks, among the plurality of aisles and/or among the plurality of data centers, to reduce, and in some embodiments to minimize, overall power consumed by the plurality of racks, aisles and/or data centers for the non-data processing overhead. Also, in any of the above-described environments, the selectively assigning the future data processing workload may further comprise predicting future power usage by the rack, aisle and/or data center based on the metric of power consumed by the rack, aisle and/or data center for non-data processing overhead.

Moreover, any of the above described embodiments may further comprise determining a respective power utilization index for a respective one of the plurality of servers in the rack, the respective power utilization index determining an amount of energy that is consumed by the respective one of the plurality of servers in the rack, for a unit of workload performed by the respective one of the plurality of servers in the rack. Respective power consumption of the respective ones of the plurality of servers in the rack is predicted based on the respective power utilization indexes. The future data processing workload is selectively assigned to one of the plurality of servers on the rack based on the respective power consumption of the respective ones of the plurality of servers in the rack for the future data processing workload.

Various embodiments have been described above in terms of assigning workloads in space, i.e., among data centers, aisles, racks and/or servers. However, other embodiments may also add a time dimension by selectively assigning the future data processing workloads in a time frame that reduces a cost of the power consumed by the data center, aisle, rack and/or server for the non-data processing overhead. Additionally, any of the embodiments described herein may also take into account the availability of the data center, aisle, rack and/or server to perform the future data processing workload. Thus, any of the selective assignments may be predicated upon availability to perform the future data processing workload.

In some embodiments, a combination of metrics for data processing overhead and non-data processing overhead may be used for future workload assignments. For example, in some embodiments, future data processing workloads may be assigned to a data center, to an aisle in a data center and/or to a rack in an aisle of a data center, based upon metrics of power consumed by the data center, by the aisle and/or by the rack, for non-data processing overhead according to any of the embodiments described herein. Within a rack, the future data processing workload may then be selectively assigned to a server in the rack based upon a power utilization index for a respective one of the plurality of servers in the rack, that defines an amount of energy that is consumed by the respective one of the plurality of servers in the rack, for a unit of workload performed by the respective ones of the plurality of servers in the rack.

In some embodiments, the power utilization index is determined by obtaining measurements of power consumed by the server in response to a plurality of workloads. Measurements of workload demands placed on the server are also obtained for the plurality of workloads. The power utilization index for the server is then determined from the measurement of power consumed by the server in response to the plurality of workloads and the measurement of workload demand placed on the server for the plurality of workloads.

In some embodiments, the measurements of workload demand placed on the server comprise measurements placed on a processor of the server, and may be based on demands placed on a core of the processor, on threads running on the processor, and on an operating system running on the processor, for the plurality of workloads. Moreover, in some embodiments, future power usage by the server may be predicted by predicting projected workload demand for the server over a future time interval and combining the predicted workload demand for the server and the power utilization index to predict future power usage by the server over the future time interval.

In other embodiments, more complicated measurements may be used to determine the power utilization index, taking additional components of the server into account. For example, some embodiments obtain measurements of power consumed by the server in response to a plurality of workloads, and obtain measurements of workload demands placed upon a processor subsystem of the server, a memory subsystem of the server, a network communication subsystem of the server and a storage (disk drive and/or network store) subsystem of the server, for the plurality of workloads. Power consumption coefficients are determined for the processor subsystem, the memory subsystem, the network communications subsystem and the storage subsystem, for a unit of workload demand placed on the processor subsystem, the memory subsystem, the network communications subsystem and the storage subsystem. The power consumption coefficients may be determined using a regression analysis on the measurements of power and the measurements of workload demand. Moreover, in these embodiments, future power usage by the server may be predicted by predicting projected workload demand for the processor subsystem, the memory subsystem, the network communications subsystem and the storage subsystem over a future time interval. The respective projected workload demands for the processor subsystem, the memory subsystem, the network communications subsystem and the storage subsystem over the future time interval are combined with the respective power consumption coefficients of the processor subsystem, the memory subsystem, the network communications subsystem and the storage subsystem.

It will also be understood that various embodiments have been described above in connection with methods. However, various other embodiments described herein can provide analogous computer systems and computer program products.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Figure 1:
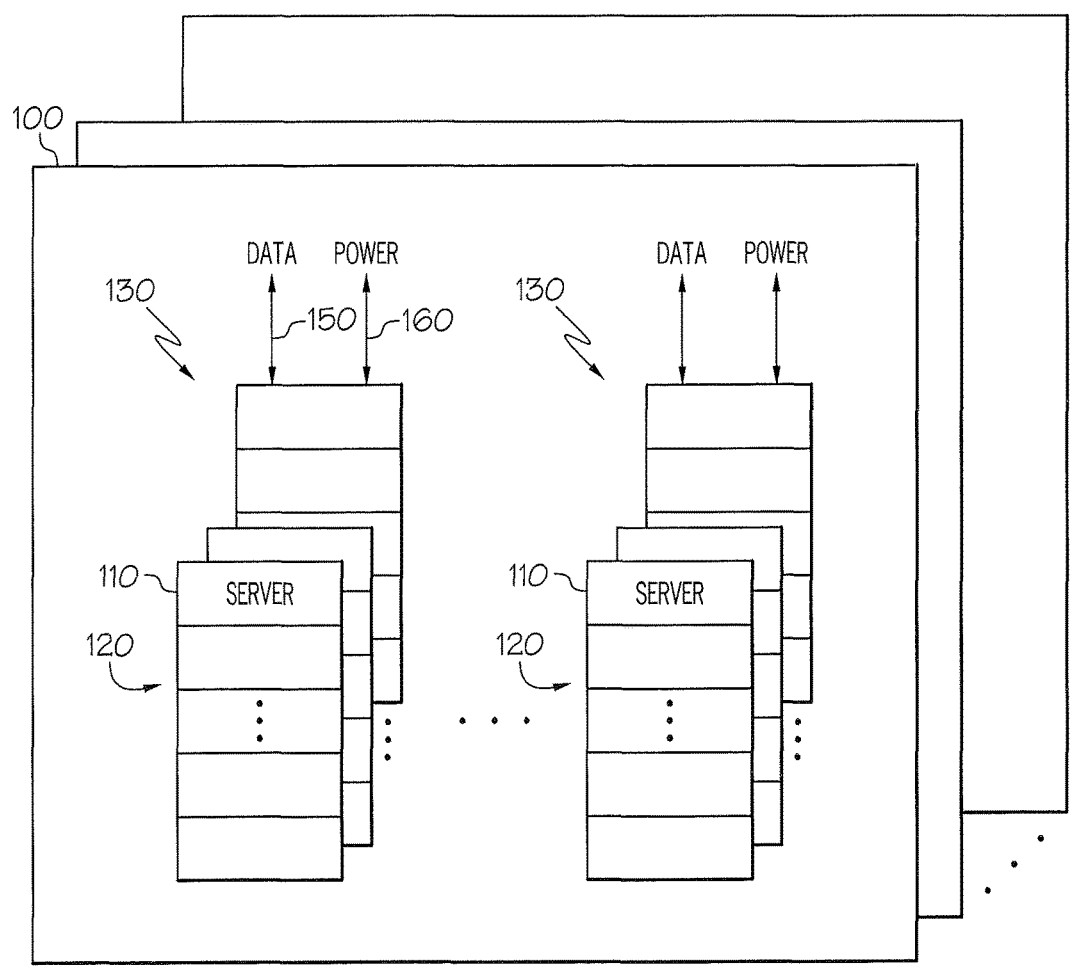
FIG. 1 is a simplified block diagram of a conventional data center.

As was noted above, data center power consumption is often at an industrial scale and some data centers may consume as much electricity as a small town. Yet, heretofore, mechanisms do not appear to have been available to provide a reliable estimate of energy that may be consumed by a server for a given workload. Various metrics may exist that can provide a normalized unit of computing demand that is placed on an Information Technology (IT) infrastructure in a data center. This metric may be thought of as being similar to Millions of Instructions Per Second (MIPS) in mainframe technology. One such metric is referred to as Total Processing Power (TPP) that was developed by Hyperformix, Inc., and is now embodied, for example, in the computer programs "CA Capacity Manager" and "CA Virtual Placement Manager", both of which are marketed by CA, Inc.

According to various embodiments described herein, a power utilization index, also referred to as a "Portable Energy Consumption" (PEC) metric, is provided that defines an amount of power that is consumed by a server for a unit of workload performed by the server. For example, in some embodiments, if a unit of workload is measured in "TPP", then the power utilization index can provide a "Watt/TPP" metric that enables estimation of the energy that will be used for processing one TPP of demand. Future power usage by the server may then be predicted based on the power utilization index and a projected workload demand on the server. Knowledge of the total TPP demand on the server, for example for the next hour, can predict future power usage in terms of "Watts per hour". By determining energy demand per unit of normalized computing demand, future power usage by a server may be predicted, and workload may be assigned in response to the prediction. The power utilization index may provide a normalized metric, so that the power utilization index may provide a reliable estimate of the energy use across many servers from many manufacturers having different configurations and/or capacities. Thus, the power utilization index can be computed and stored for a server in an IT Asset Management System, to help characterize and compare servers of same configuration across the different vendors of the server products. Existing energy management metrics do not appear to be normalized, so that it is difficult to use these energy management metrics across the wide variety of servers that are used in a data center. It will be understood that the terms "power" and "energy" are used synonymously herein, as energy usage may be used to derive power usage (e.g., Joules/sec), and power usage may be used to derive energy usage (e.g., Joules and/or kWhr).

According to various other embodiments described herein, non-data processing overhead, also referred to as "non-IT overhead" may be taken into account in allocating future workload among a plurality of data centers, aisles in a data center, racks in a data center and/or servers in a rack of a data center, in addition to considering power that is consumed by a server, rack, aisle and/or data center to perform a data processing workload, also referred to as "IT overhead". An ability to predict total IT and non-IT energy use of a future workload can open up opportunities for reducing, and in some embodiments minimizing, total energy demand by placing workload in different data centers and/or in different parts of a data center, in terms of space and/or time. Placing workload in terms of space can allow various embodiments described herein to find a physical server, rack, aisle and/or data center in such a way that the total energy expenditure may be reduced or minimized. Placing workload in terms of time may allow a time interval to be found when execution of a future workload would reduce or minimize the total energy expenditure for performing the workload.

FIG. 1 is a simplified block diagram of a conventional data center 100. As shown in FIG. 1, the data center 100 includes a plurality a servers 110 that may be configured in racks 120. The racks may be configured along aisles 130. Data input/output connections 150 are provided, and power connections 160 are also provided to the servers 110. A given enterprise may operate multiple data centers 100, as illustrated in FIG. 1.

It will be understood that the simplified block diagram of FIG. 1 does not illustrate many other systems of the data center 100 including, for example, environmental systems such as air conditioning systems, power and backup power systems, cable routing systems, fire protection systems, security systems and layout of racks and aisles. It will also be understood that a respective server 110 may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable medium.

Figure 2:
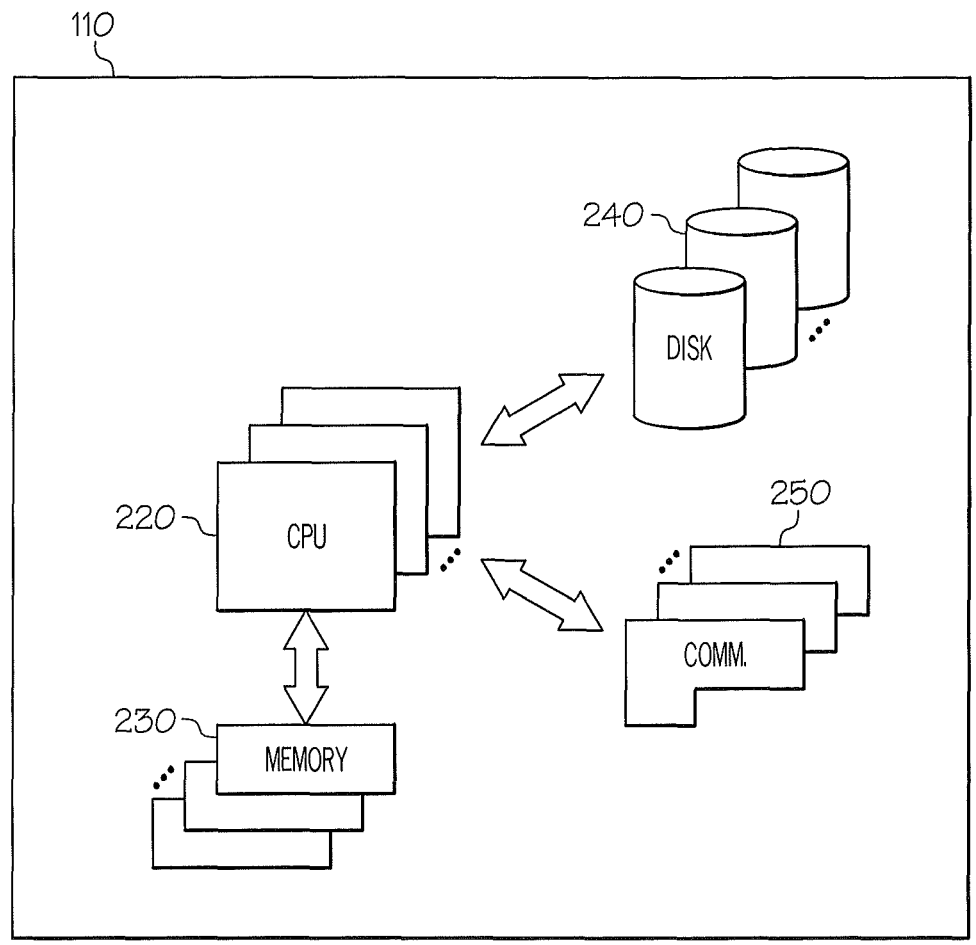
FIG. 2 is a simplified block diagram of a conventional server in a conventional data center of FIG. 1.

FIG. 2 is a simplified block diagram of a conventional server 110 of FIG. 1. As shown, the server may include a processor subsystem 220, including one or more Central Processing Units (CPU) on which one or more operating systems and one or more applications run. A memory subsystem 230 may include a hierarchy of memory devices such as Random Access Memory (RAM), Read-Only Memory (ROM), Erasable Programmable Read-Only Memory (EPROM) or flash memory, and/or any other solid state memory devices. A storage subsystem 240 may also be provided, which may include a portable computer diskette, a hard disk, a portable Compact Disk Read-Only Memory (CDROM), an optical storage device, a magnetic storage device and/or any other kind of disk- or tape-based storage subsystem. The storage subsystem 240 may include disk drive and/or network store components. Finally, a network communications subsystem 250 may provide bidirectional communications within the data center and/or external to the data center, for example using the Internet and/or dedicated lines.

Figure 3:
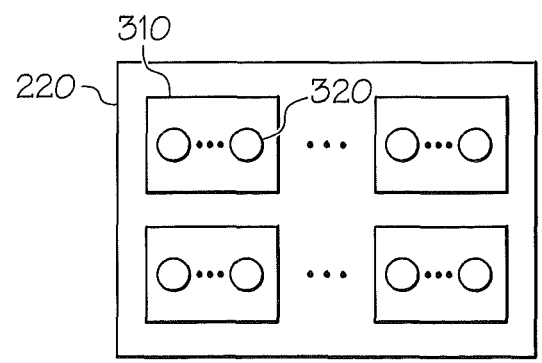
FIG. 3 is a simplified block diagram of a conventional Central Processing Unit (CPU) of a server of FIG. 2.

FIG. 3 is a simplified block diagram of one of the processor subsystems 220 of FIG. 2. As shown in FIG. 3, a processor subsystem 220 may include a plurality of microprocessor cores 310, each of which may include, for example, its own floating point unit and its own instruction pipeline. Within the microprocessor cores 310 it is possible to fork the instruction pipeline into multiple logical processor threads 320.

Figure 4:
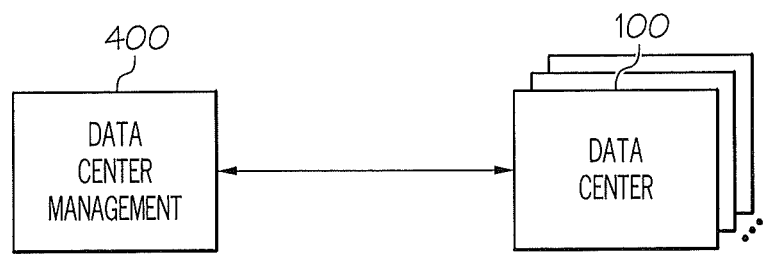
FIG. 4 is a simplified block diagram of one or more data centers including a data center management system, method and computer program product according to various embodiments described herein.

FIG. 4 is a simplified block diagram of systems, methods and/or computer program products 400 for managing one or more data centers 100 according to various embodiments described herein. These data center management systems, methods and/or computer program products 400 may reside external to the data center(s) 100, in the data center(s) 100 but separate from the data center servers 110, and/or as part of one or more of the data center servers 110.

Figure 5:
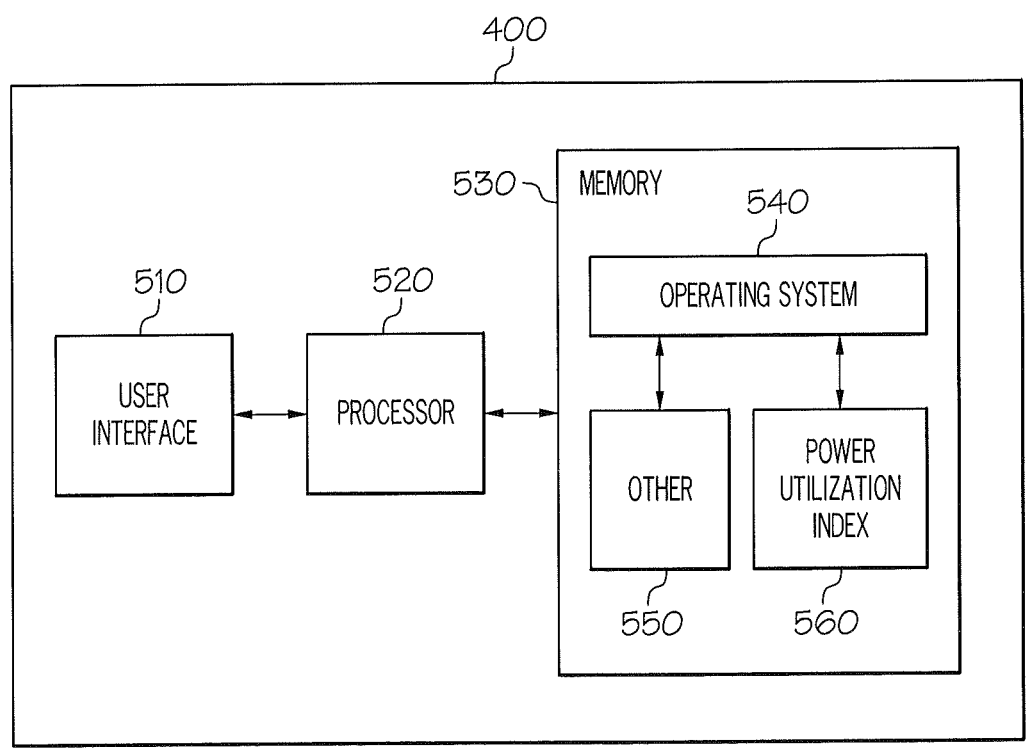
FIG. 5 is a block diagram of a data center management system, method and computer program product according to various embodiments described herein.

FIG. 5 is a block diagram of a data center management system, method and/or computer program product 400, according to various embodiments described herein. As shown in FIG. 5, the data center management system, method and/or computer program product 400 includes a processor 520, which may be embodied as one or more enterprise, application, personal, pervasive and/or embedded computer systems that are operable to receive, transmit, process and store data using any suitable combination of software, firmware and/or hardware and that may be standalone or interconnected by any conventional, public and/or private, real and/or virtual, wired and/or wireless network including all or a portion of the global communication network known as the Internet, and may include various types of tangible, non-transitory computer readable medium. A user interface 510 may include displays and user input devices, such as keyboards, touch screens and/or pointing devices. A memory 530 may include any computer-readable storage medium. An operating system 540 resides in the memory 530 and runs on the processor 500, as may other data center management systems, methods and/or computer program products 550. A power utilization index system, method and/or computer program product 560 according to various embodiments described herein also resides in the memory 530 and runs on the processor 520.

Figure 6:
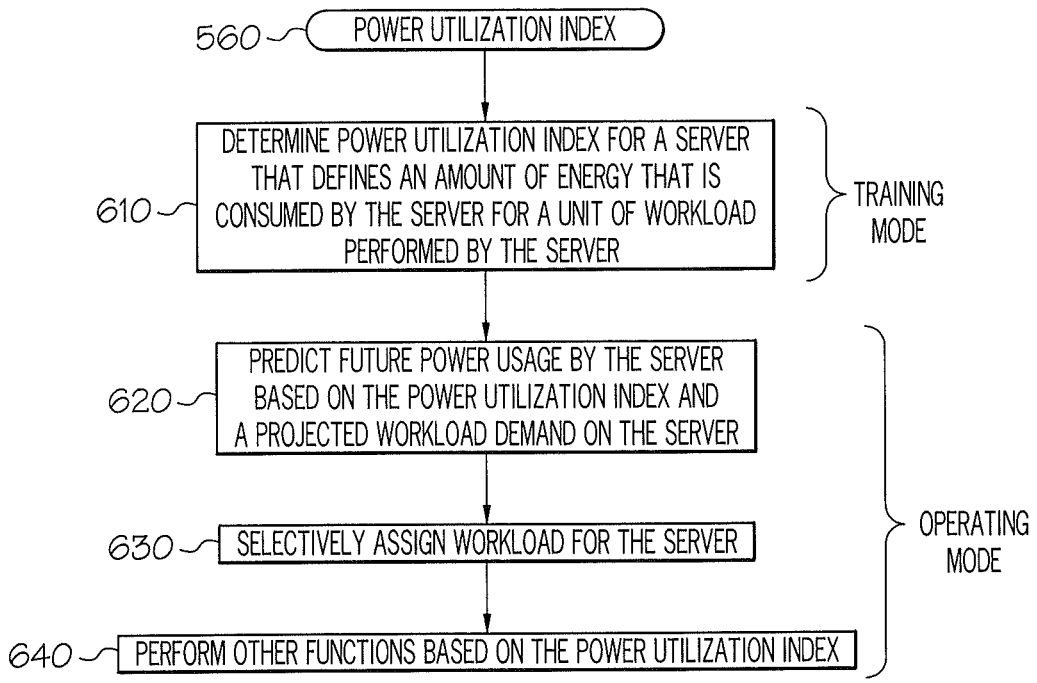
FIGS. 6-8 are flowcharts of operations that may be performed by a power utilization index system, method and/or computer program product according to various embodiments described herein.

FIG. 6 is a flowchart of operations that may be performed by a power utilization index system, method and/or computer program product 560, according to various embodiments described herein. Referring to FIG. 6, the power utilization index may be determined at Block 610 in a training or modeling mode, and then may be used at Blocks 620-640 in an operating or predicting mode. It will be understood that the training mode of Block 610 may continue to be used to refine the power utilization index, even while it is being operated in the operating mode of Blocks 620-640.

More specifically, referring to FIG. 6, at Block 610, a power utilization index is determined for a server, that defines an amount of energy that is consumed by the server for a unit of workload performed by the server. Thus, a normalized portable energy consumption metric is generated that specifies energy demand per unit of normalized computing demand. Then, at Block 620, future power usage by the server is predicted based on the power utilization index and a projected workload demand on the server. In some embodiments, workload may be selectively assigned for the server at Block 630. Specifically, workload may be assigned to the server or assigned to a different server, in response to the predicting of Block 620. Alternatively, or in addition, at Block 640, other functions may be performed based on the power utilization index. For example, availability of the data center may be improved, capacity constraints may be managed, operating costs may be lowered, capital resource efficiency may be improved, financial modeling may be provided, and/or the carbon footprint of the data center may be managed.

Figure 7:
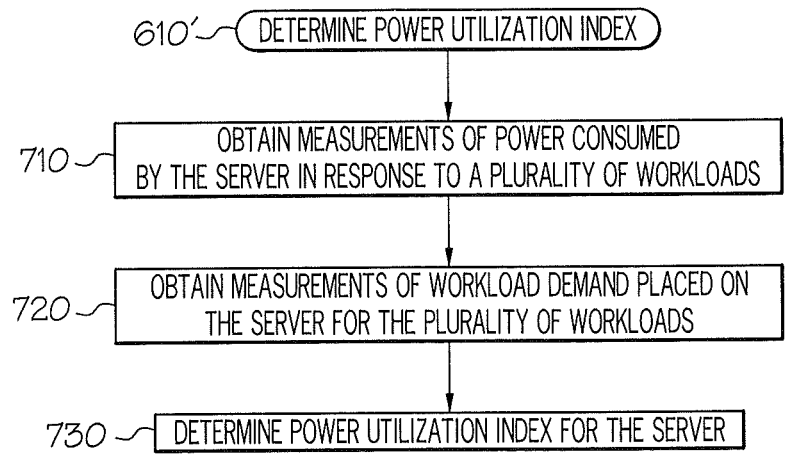

FIG. 7 is a flowchart of operations 610' that may be performed to determine a power utilization index according to various embodiments described herein. Referring to FIG. 7, at Block 710, measurements of power consumed by the server in response to a plurality of workloads are obtained. Moreover, at Block 720, measurements of workload demand placed on the server for the plurality of workloads are obtained. Then, at Block 730, the power utilization index for the server is determined from the measurements of power consumed that were obtained at Block 710, and the measurements of workload demand that were obtained at Block 720. In some embodiments, a single power utilization index may be determined for the server, whereas in other embodiments, a plurality of power utilization indices may be obtained, which may vary as a function of workload demand placed on the server.

Additional discussion of FIG. 7 will now be provided. Specifically, referring again to Block 710, measurements of power consumed by the server in response to a plurality of workloads may be obtained by monitoring the power that is provided to the server, such as the server 110 of FIG. 1, over the power lines, such as the power lines 160 of FIG. 1, while the server performs a plurality of workloads. For example, the power demand may be obtained using a Data Center Infrastructure Management (DCIM) computer program that is marketed by CA Technologies, and/or other DCIM tools. The CA DCIM software is described, for example, in a white paper entitled "*From Data Center Metrics to Data Center Analytics: How to Unlock the Full Business Value of DCIM*" by Gilbert et al., copyright 2013 CA Technologies, the disclosure of which is hereby incorporated herein by reference in its entirety as if set forth fully herein. The DCIM software includes a module called "DCIM ecoMeter" that can be used for power management. DCIM ecoMeter is described, for example, in a white paper entitled "*Five steps for increasing availability and reducing energy consumption and costs across cloud and virtual platforms*" to Ananchaperumal et al., copyright 2012 CA, the disclosure of which is hereby incorporated herein by reference in its entirety as if set forth fully herein. Moreover, the various workloads that are being performed by the server while the measurements of power consumption are being obtained may be determined using application performance management, workload automation and/or infrastructure management software, which is widely used for performance monitoring of servers.

Referring again to Block 720, measurements of the workload demand placed on the server for the plurality of workloads may also be obtained. One technique for determining a normalized measurement of demand placed on a server was developed by Hyperformix, and is described, for example, in U.S. Pat. No. 7,957,948 to Zink et al., the disclosure of which is hereby incorporated herein by reference in its entirety as if set forth fully herein; in a data sheet entitled "*Hyperformix Capacity Manager Data Sheet*", Version 5.0, Copyright Hyperformix, Inc., the disclosure of which is hereby incorporated herein by reference in its entirety as if set forth fully herein; and in release notes entitled "*Hyperformix® Capacity Manager™ 5.0.1*", copyright 2001-2009 Hyperformix, Inc., the disclosure of which is hereby incorporated herein by reference in its entirety as if set forth fully herein. These products develop a "Total Processing Power" metric referred to as "TPP". The TPP metric uses data on the configuration of the server that may be obtained, for example, from a Configuration Management DataBase (CMDB) and/or an Asset Manager DataBase (AMDB). The AMDB may list the manufacturer, serial number, product name, etc. of the server, whereas the CMDB may list the specifications of the server, including processor, memory, operating system, etc., that are used to derive the TPP metric of normalized demand that is placed on the server for the plurality of workloads. More specifically, as described, for example, in the Zink et al. patent and referring back to FIG. 3, this normalized demand metric, also referred to as a "system scalability factor", may be calculated by measuring demands placed on a processor 220 of the server, by measuring demands placed on a core 310 of the processor, on threads 320 running on the processor, and on an operating system running on the processor for the plurality of workloads. Regression analysis may be used to calculate a TPP metric for the server and/or plurality of workloads that run on the server. The TPP values may be stored in the CMDB for future use.

Referring again to Block 730, the power utilization index for the server may be determined from the measurements of power consumed by the server in response to the plurality of workloads (Block 710) and the measurements of workload demand placed on the server for the plurality of workloads (Block 720). In some embodiments, the power utilization index may be determined by regression analysis of the historic usage of energy (Block 710) for every known service configuration for which the TPP metric exists (Block 720).

Referring back to FIG. 6, at Block 620, future power usage by the server may be predicted using the power utilization index and a projected workload demand on the server expressed, for example, in units TPP. Specifically, the future total energy demand of a given workload may be predicted using the formula:

$$\text{Total\_Energy\_Demand\_of\_Workload} = \text{PEC} * \text{Projected\_Computing\_Demand\_expressed\_in\_TPP}. \quad (1)$$

Accordingly, various embodiments of FIG. 6 can compute projected energy demand of a workload. It can use two components: the TPP metric that is currently used in the CA Hyperformix program product, and configuration data from CMDB/AMDB and/or infrastructure/application management program products.

Embodiments of FIG. 7 determine the power utilization index by taking into account workload demand placed on a processor subsystem 220 of the server, and in some embodiments placed on a core of the processor subsystem 220, on threads 320 running on the processor subsystem 220 and on an operating system running on the processor subsystem 220, for a plurality of workloads. In contrast, embodiments that will now be described in connection with FIG. 8 can also take into account workload demands placed on a memory subsystem 230 of the server 110, a network communications subsystem 250 of the server 110 and a storage subsystem 240 of the server 110, in addition to the processor subsystem 220 of the server 110.

Figure 8:
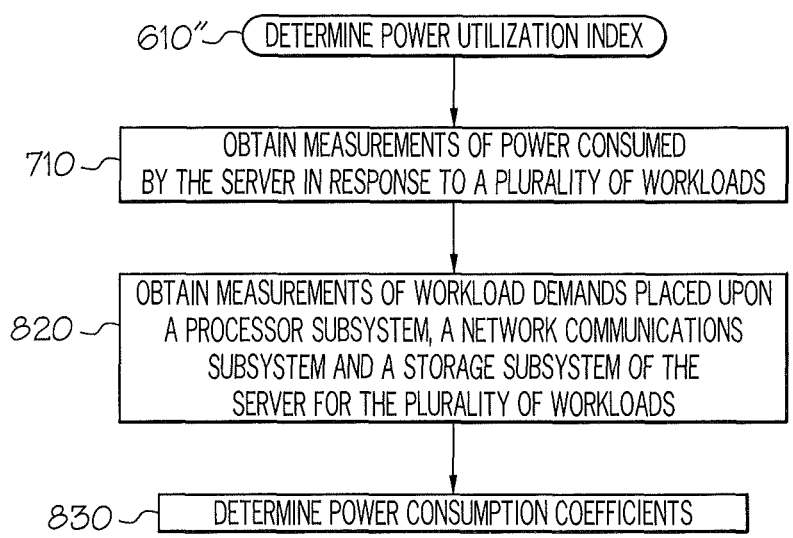

Referring to FIG. 8, these systems, methods and computer program products for determining a power utilization index 610" may perform the operations of Block 710 to obtain measurements of power consumed by the server in response to a plurality of workloads. Generally, power consumed by the various subsystems of the server are not known independently, but may be determined using a regression analysis as will now be described. Specifically at Block 820, measurements of workload demands placed upon a processor subsystem 220 of the server 110, a memory subsystem 230 of the server 110, a network communications subsystem 250 of the server 110 and a storage subsystem 240 of the server 110 may be obtained for the plurality of workloads. Measurements of workload demand placed on the processor subsystem 220 may be determined by a TPP measurement of the processor subsystem, as was described above. Measurements of the workload demands placed on the memory subsystem 230 may be obtained, for example, by monitoring a percentage utilization of the memory subsystem, i.e., a percentage of the total time for which the memory subsystem is engaged in read or write operations. Measurements of the workload demand on the network communications subsystem 250 may be obtained by monitoring the percentage of network utilization, i.e., the percentage of the total time for which the network communications subsystem is communicating with the processor and/or with external networks. Finally, measurements of workload demand on the storage subsystem 240 may be determined by percent of disk active time, i.e., the percentage of the total time for which the storage subsystem is performing read or write operations. These measurements of TPP, percentage of memory utilization, percentage of network utilization and disk active time may be obtained from the server monitoring tools that were described above in connection with Block 720.

Then, referring to Block 830, power consumption coefficients of the processor subsystem 220, the memory subsystem 230, the network communications subsystem 250 and the storage subsystem 240 are determined for a unit of workload demand placed on the processor subsystem 220, the memory subsystem 230, the network communications subsystem 250 and the storage subsystem 240. These coefficients may be stored in the CMDB for later use in predicting energy demand.

A specific example of embodiments of FIG. 8 will now be described. Specifically, there are two general components of server power consumption: fixed and variable. Fixed components involve the basic power needed for the server when it is in an idle state. The variable component involves power consumption variation with respect to the workload of the server.

The variable component is influenced by the server subsystems and their efficiency at various operating levels. The primary subsystems are the processor (CPU) 220, memory 230, network communications 250 and storage 240 subsystems.

Apart from these subsystems, the server fan or fans is the another component that can influence the server energy consumption. Historically, CPUs used to be the primary producers of heat in the server and most thermal sensors were deployed in the CPU zone so that the fan was switched on when CPU was operating at high speed to dissipate the heat. However, as memory 230 has become denser, the primary heat source has shifted, so that many servers also provide a fan for the memory to control heat. In addition to CPU 220 and memory 230, fans are also often used to cool hard disk drives (HDDs). Moreover, on older servers, fans were all operated at full speed even if only one of these zones needed to be cooled. Modern servers may utilize zoned fans working in conjunction with large numbers of thermal sensors. Using information collected from these sensors, a sophisticated control algorithm can identify specific components that require cooling, and the fan speed for each zone may be adjusted accordingly so that full speed is only used where necessary.

Considering the variations of server design and build from vendor to vendor, it is desirable to understand power utilization trends by server type. A data center typically hosts many different types of servers with many different generations of technology. Various embodiments described herein can generate a power utilization index for every server in a data center, which can be stored as part of server details in a CMDB. A model may also be built based on historical power consumption to compute an hourly (and/or other time frame) energy consumption forecast for each type of server hosted in the data center.

Various embodiments described herein can use data from two sources: Real-time actual power consumption of the servers may be monitored, for example, around the clock, using for example DCIM software (Block 710). Also, real-time actual workloads on the server may be monitored using conventional server monitoring tools. In some embodiments, workload may be described as normalized TPP for the processor subsystem, memory utilization (e.g., as a %), network traffic (e.g., as a %), and storage (disk drive and/or network store) active time (e.g., as a %).

The following Table illustrates an example of this data collection at 1-hour intervals:

TABLE

| Time (hr) | Power Utilization (PU) (W) | TPP | Memory (%) | Network Utilization (NWU) (%) | Storage (Disk Drive and/or Network Store) Active (SAT) (%) |
|---|---|---|---|---|---|
| 1 | 55 | 40 | 50 | 4 | 2 |
| 2 | 70 | 60 | 35 | 2 | 1 |
| 3 | 80 | 75 | 78 | 4 | 1 |

Based on the data in column 2 of the Table, an hourly and/or daily average of power utilization (PU) may be computed for every server and stored in CMDB as part of the server details. Additionally, a multi-variant regression model may also be computed (Block 830) to forecast energy demand based on workload variation according to the following formula:

$$PU = X_1 * TPP + X_2 * RAM + X_3 * NWU + X_4 * SAT + C. \quad (2)$$

Here, X1, X2, X3 and X4 correspond to correlation coefficients in the regression model between power utilization and server sub-systems. C is a constant that may be determined as part of the regression model when determining the correlation coefficients. C may also be referred to as a "regression constant".

Accordingly, the calculations described above also provide an embodiment wherein the predicting of Block 620 comprises predicting projected workload demand for the processor subsystem 220, the memory subsystem 230, the network communications subsystem 250 and the storage subsystem 240 over a future time interval, and combining the respective projected workload demand for the processor subsystem 220, the memory subsystem 230, the network communications subsystem 250 and the storage subsystem 240 over the future time interval and the respective power consumption coefficients of the processor subsystem 220, the memory subsystem 230, the network communications subsystem 250 and the storage subsystem 240.

Figure 9:
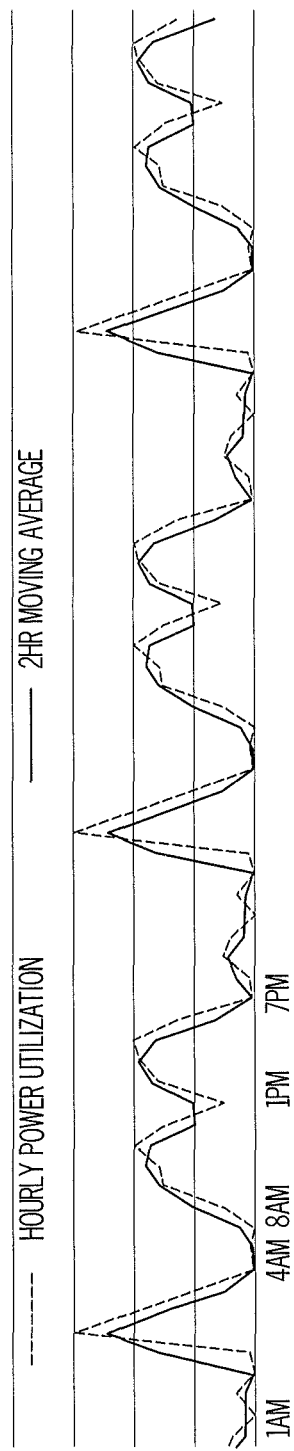
FIG. 9 graphically illustrates a prediction of energy usage according to various embodiments described herein.

Alternatively, having historical power utilization data, a 2-hour (or other time frame) moving average graph can be plotted for a specific duration, and can be used as a model to predict energy demand by server. FIG. 9 depicts an example of a moving average graph for 30 days. Many other embodiments of predicting may be provided according to various embodiments described herein.

Accordingly, the power utilization index may be used as a differentiating factor that can be applied in multiple contexts to make informed decisions about qualifying a server with respect to energy efficiency. Scalability models may be produced for every configuration of a server in a data center. Insight may be obtained into the data center with respect to how energy efficient each server is, and for identifying high carbon contributing servers. An hourly (or other time frame) forecast model may be used to estimate energy demand for each server in a future time period. Moreover, an energy estimate may be provided for a given server with respect to workload variation.

According to various other embodiments that will now be described, non-data processing overhead, also referred to as "non-IT overhead" may be taken into account in allocating future workload among a plurality of data centers, aisles in a data center, racks in a data center and/or servers in a rack of a data center, in addition to considering power that is consumed by a server, rack, aisle and/or data center to perform a data processing workload, also referred to as "IT overhead". An ability to predict total IT and non-IT energy use of a future workload can open up opportunities for reducing, and in some embodiments minimizing, total energy demand by placing workload in different data centers and/or in different parts of a data center, in terms of space and/or time. Placing workload in terms of space can allow various embodiments described herein to find a physical server, rack, aisle and/or data center in such a way that the total energy expenditure may be reduced or minimized. Placing workload in terms of time may allow a time interval to be found when execution of a future workload would reduce or minimize the total energy expenditure for performing the workload.

Figure 10:
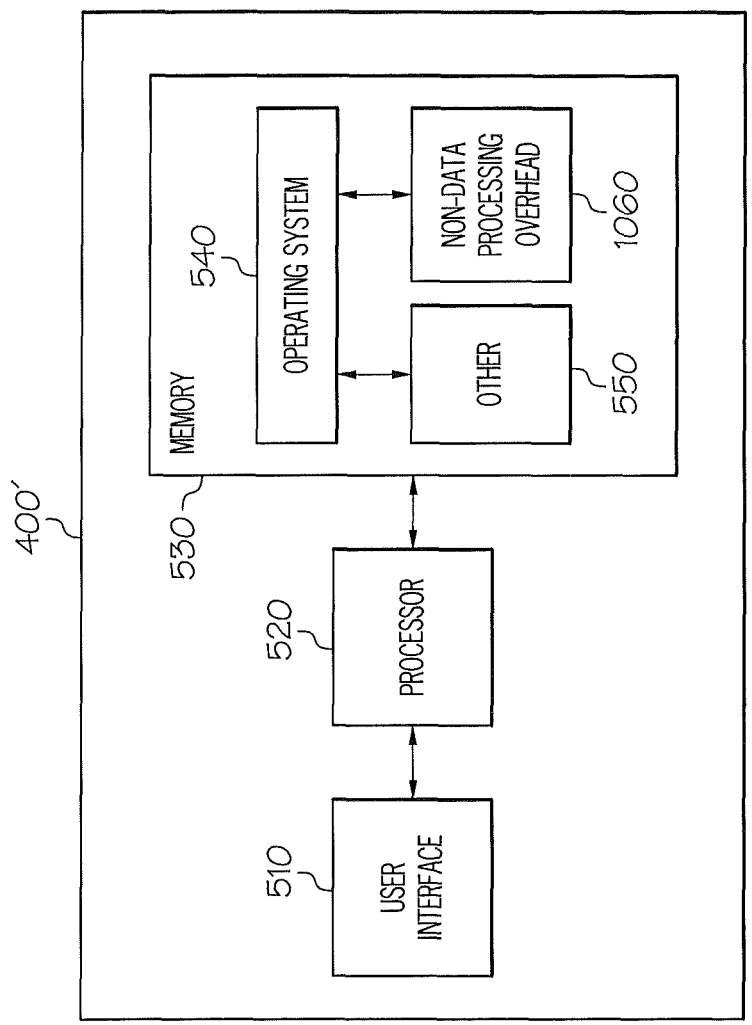
FIG. 10 is a block diagram of a data center management system, method and computer program product according to various other embodiments described herein.

FIG. 10 is a block diagram of a data center management system, method and/or computer program product according to various other embodiments described herein. FIG. 10 is similar to FIG. 5, except that a non-data processing overhead system, method and/or computer program product 1060 according to various embodiments described herein, is also provided in the memory 530 and runs on the processor 520. As will be described in more detail below, the non-data processing overhead system, method and/or computer program product 1060 can use regression analysis against data collected by, for example, the DCIM/ecoMeter infrastructure that was already described, on a server, rack, aisle and/or data center level, by directly measuring energy that is used in a given time frame while a given workload is being executed. A model of an energy profile of a monitored unit can then be built in such a way that total energy use of a server, rack, aisle and/or data center may be measured as a function a power utilization index for data processing (IT) overhead and a metric of power consumed by the unit for non-data processing (non-IT) overhead. Thus, total energy demand of a facility (rack, aisle and/or data center) may be estimated as a function of workload volume that may be placed on the facility. This estimate may be used to improve or optimize placement of future IT workload on the facility, by using load balancing, virtual machine placement, job scheduling and/or other selective assignment techniques.

Figure 11:
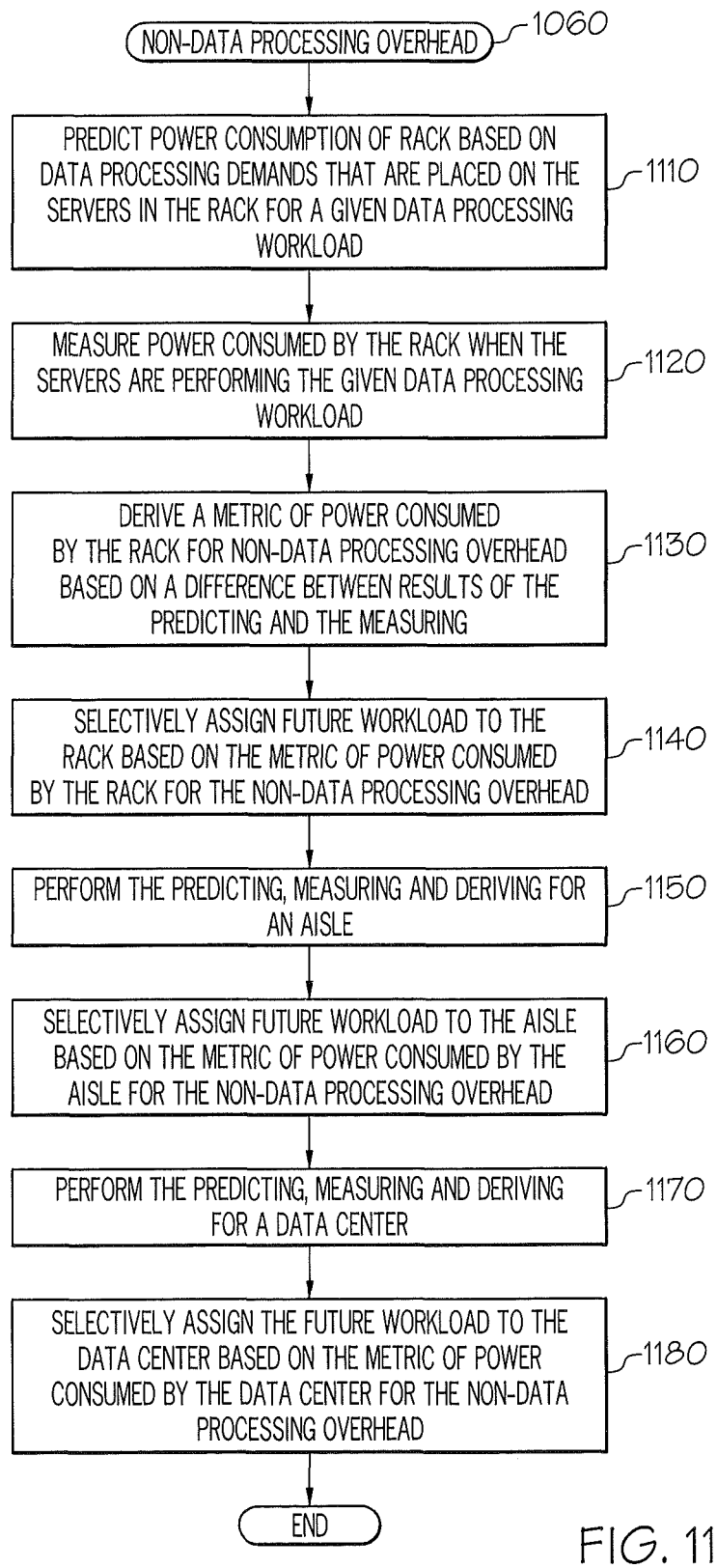
FIG. 11 is a flowchart of operations that may be performed by a non-data processing overhead system, method and computer program product according to various embodiments described herein.

FIG. 11 is a flowchart of operations that may be performed by a non-data processing overhead system, method and/or computer program product 1060 according to various embodiments described herein. Referring to FIG. 11, at Block 1110, power consumption of a rack 120 that comprises a plurality of servers 110, is predicted based on data processing demands that are placed on the plurality of servers 110 for a given data processing workload. Any of the embodiments described in connection with FIGS. 1-9 may be used to predict power demand from the servers in the rack based on workload. The rack level power utilization should be close to the aggregation of the power utilization of the individual servers for performing the given workload based on any of the embodiments of a power utilization index that were described above. Thus, the power utilization (PU) per rack ($R_1$) can be computed by adding up all the server's utilization hosted in a rack ($R_1$). Considering servers ranging from $S_1$ to $S_n$:

$$\text{TotalRack } PU = R_1\_S_1\_PU + R_1\_S_2\_PU + R_1\_S_3\_PU + \ldots + R_1\_S_n\_PU \quad (3)$$

Referring now to Block 1120, power that is actually consumed by the rack 120 when the plurality of servers 110 are performing the given data processing workload is measured, for example by measuring the power on the power line 160. In typical data centers, power consumed by the individual servers may not be able to be measured. However, power consumed by a rack 120 may be able to be measured. In other embodiments, power consumed by the individual servers 110 may also be measured and added, to obtain the measurement of power that is consumed by a rack 120. Power consumed may be measured using any of the monitoring tools that were described above.

Referring now to Block 1130, a metric of power consumed by the rack for non-data processing overhead may be derived based on a difference between results of the predicting (Block 1110) and the measuring (Block 1120). Thus, with the real time monitored data available from the monitoring tools, the power consumption from the rack (Rack_PU_direct) can be directly obtained. The ΔRackPU metric is the difference between the Rack_PU_direct and the Total Rack PU computed from Equation (3):

$$\Delta RackPU = Rack\_PU\_direct - Total\ Rack\ PU. \quad (4)$$

In Equation (4), ΔRackPU is the metric of power consumed by the rack for non-data processing overhead, Rack_PU_direct is the measurement of power consumed by the rack when the servers 110 are performing the given data processing workload (Block 1120), and Total Rack PU is the predicted power consumption of the rack 120 based on data processing demands (Block 1110).

At Block 1140, future data processing workload is selectively assigned to the rack 120 based on the metric of power consumed by the rack for the non-data processing overhead that was determined at Block 1130. For example, data processing workload may be assigned to a rack that is available to perform the data processing workload, and that has a low or lowest ΔRackPU among the available racks.

Referring now to Block 1150, the predicting (Block 1110), measuring (Block 1120) and deriving (Block 1130) may be performed for an aisle 130 that comprises a plurality of racks 120 including the rack, to derive a metric of power consumed by the aisle 130 for the non-data processing overhead. Thus, the ΔAislePU can also be computed by adding up all the PU at the rack level in an aisle and the ΔAisle_PU can be obtained from the difference between the Aisle_PU_direct and the Total Aisle PU computed:

$$Total\ Aisle\ PU = I_1\_R_1\_PU + I_1\_R_2\_PU + I_1\_R_3\_PU + \ldots + I_1\_R_n\_PU. \quad (5)$$

$$\Delta AislePU = Aisle\_PU\_direct - Total\ Aisle\ PU. \quad (6)$$

In Equations (5) and (6), Total Aisle PU corresponds to the predicted power consumption of an aisle 130 that comprises a plurality of racks 120 based on data processing demands that are placed on the plurality of servers 110 in the aisle for given data processing workload, and Aisle_PU_ direct is a measurement of the power consumed by the aisle 130 when the plurality of servers 110 in the aisle are performing the given data processing workload. ΔAislePU is the metric of power consumed by the aisle for the non-data processing overhead. At Block 1160, the future data processing workload is selectively assigned to the aisle 130 based on the metric of power consumed by the aisle 130 for the non-data processing overhead. For example, data processing workload may be assigned to an aisle that is available to perform the data processing workload, and that has a low or lowest ΔAislePU among the available aisles.

Referring now to Block 1170, the predicting (Block 1110), the measuring (Block 1120) and the deriving (Block 1130) may be performed for a data center 100 that comprises a plurality of aisles 130, including the aisle that was processed in Blocks 1150 and 1160, to derive a metric of power consumed by the data center 100 for the non-data processing overhead. Thus, the total data center PU can be computed by:

$$Total\_DC\_ITPU\_Computed = Total\ Aisle_1\ PU + Total\ Aisle_2\ PU + Total\ Aisle_3\ PU + \ldots + Total\ Aisle_n\ PU, \quad (7)$$

and the ΔTotal_DC_ITPU can be obtained by:

$$\Delta DC\_ITPU = DC\_PU\_direct - Total\_DC\_ITPU\_Computed. \quad (8)$$

In Equations (7) and (8), Total_DC_ITPU_Computed corresponds to the total predicted power consumption of the data center based on the data processing demands that are placed on the servers in the data center for the given data processing workload (Block 1110), and DC_PU_ direct is the total measured power consumed by the data center when the servers are performing the given data processing workload (Block 1120). ΔDC_ITPU corresponds to the metric of power consumed by the data center 100 for non-data processing overhead based on a difference between results of the predicting (Block 1110) and the measuring (Block 1120).

At Block 1180, future data processing workloads are then selectively assigned to the data center based on the measure of power consumed by the data center for the non-data processing overhead. For example, data processing workload may be assigned to a data center that is available to perform the data processing workload and that has a low or lowest ΔDC_ITPU among the data centers.

It will be understood that the computation of the above ΔPUs (for a rack, aisle and/or data center) have been described as being computed serially in FIG. 11. However, all the ΔPUs can be computed concurrently and stored and/or updated on a periodic or continuous basis. These ΔPUs can be used to identify the power utilizations by the non-data processing overhead at respective levels (server, rack, aisle and/or data center). These findings can be used for various information, analysis and/or optimizations. For example, the ΔPUs may be displayed in a hierarchical listing that includes ΔPUs at a rack, aisle and/or data center level, and at a server level if available. The ΔPUs may also be displayed in a plan view of the data center that illustrates, for example, the layout of racks and aisles in the data center and includes the numeric values of ΔPU and/or a color coded value, on the appropriate rack and aisle in the plan view.

The measurement and prediction of power consumption for non-data processing overhead is becoming more important for data center efficiency. Specifically, data center power consumption is growing at an alarming pace. As more and more power management features grow, the dynamic range of data center power consumption is increasing and interactions among the power management strategies across subsystems may grow more complex. It may be difficult to analyze subsystems in isolation. Individual components' power consumption can vary non-linearly with localized conditions, such as temperature at the computer room air handler (CRAH) inlet or utilization of the individual server. Reasoning about data center power is difficult because of the diversity and complexity of data center infrastructure. The following subsystems may primarily account for data center power draw: servers and storage systems; power conditioning systems; cooling and humidification systems; networking devices; and lighting and miscellaneous devices.

In order to forecast and/or optimize the power demand from servers with respect to workloads, it is desirable to know actual power utilization at various levels like server, rack aisle and data center. Measuring at different levels helps to identify losses or non-IT overheads at all levels. Various embodiments described herein can provide methodologies to measure the overheads or losses by aggregating server level measurements and comparing them with the actual measurements at various levels. Accordingly, various embodiments described herein can selectively assign future data processing workloads among the plurality of servers in a rack, among a plurality of racks in an aisle, among a plurality of aisles in a data center and/or among a plurality of data centers, based upon metrics of power consumed by the servers, racks, aisles and/or data centers for non-data processing overhead. The selection may be based, at least in part, on reducing, and in some embodiments minimizing, the overall power consumed by the racks, aisles and/or data centers for non-data processing overhead.

Figure 12:
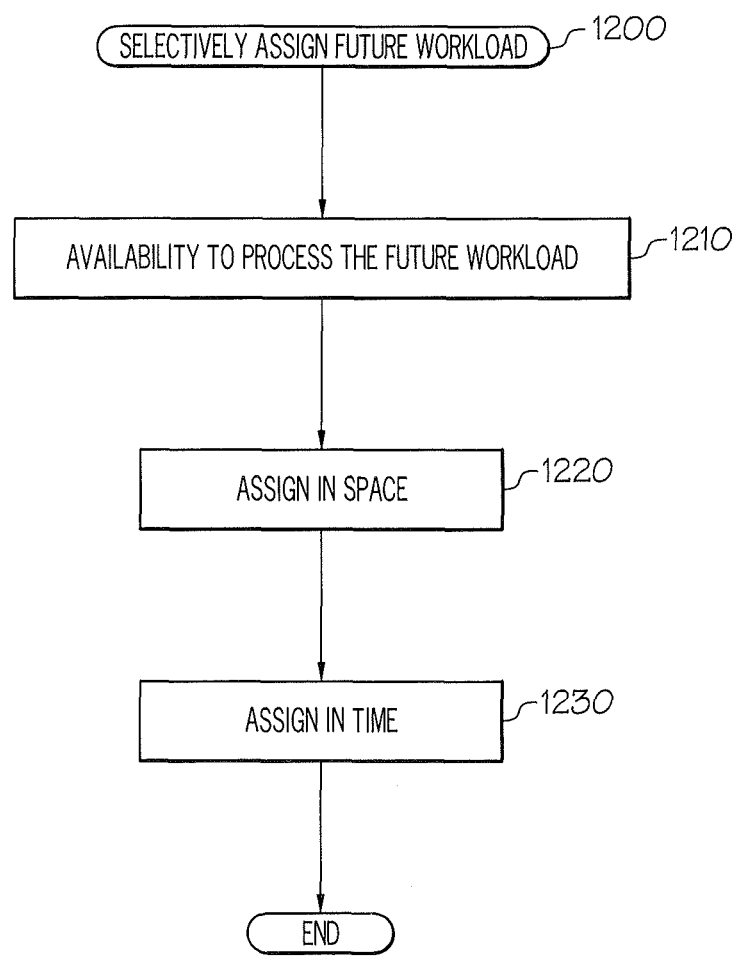
FIGS. 12 and 13 are flowcharts of operations that may be performed to selectively assign future workload according to various embodiments described herein.

FIG. 12 is a flowchart of operations that may be performed to selectively assign future workload, which may correspond to the operations of Blocks 1140, 1160 and/or 1180 of FIG. 11. Referring to FIG. 12, at Block 1210, a determination is first made as to whether the data center, rack or aisle is available to process the future workload. Stated differently, a determination is made as to whether data processing capacity is available at the data center, aisle, rack and/or server level. This determination may be made using the predicted TPP, memory, NWU and/or DAT metrics of the data centers, aisles, racks and servers as was described in connection with the Table above. Assignment may then take place in space at Block 1220 and/or in time at Block 1230.

Assignment in space (Block 1220) may take place by selecting a data center from a plurality of data centers, an aisle in the selected data center from a plurality of aisles in the selected data center, a rack in the selected aisle from a plurality of racks in the selected aisle and/or a server in the selected rack from among a plurality of servers in the selected rack, to reduce, and in some embodiments minimize, the overall power consumed for the non-data processing overhead in processing the future workload. Assignment in time (Block 1230) may also be performed to reduce, and in some embodiments minimize, a cost of the power consumed for the non-data processing overhead in performing the future workload. More specifically, power costs may be set by an electric utility to reduce power usage during peak demand times. Moreover, large energy consumers, such as data centers, may be provided other cost preferences when reducing peak demand. For example, projected energy usage for many data centers during a future time frame (e.g., one hour) may be compared, and future workload may be shifted in space to the data center with lowest projected energy usage and/or in time to an even later time. Accordingly, workload may be reassigned (rescheduled) in time to take advantage of these favorable rates and/or other incentives to reduce the overall cost of power consumed for non-data processing overheads.

Figure 13:
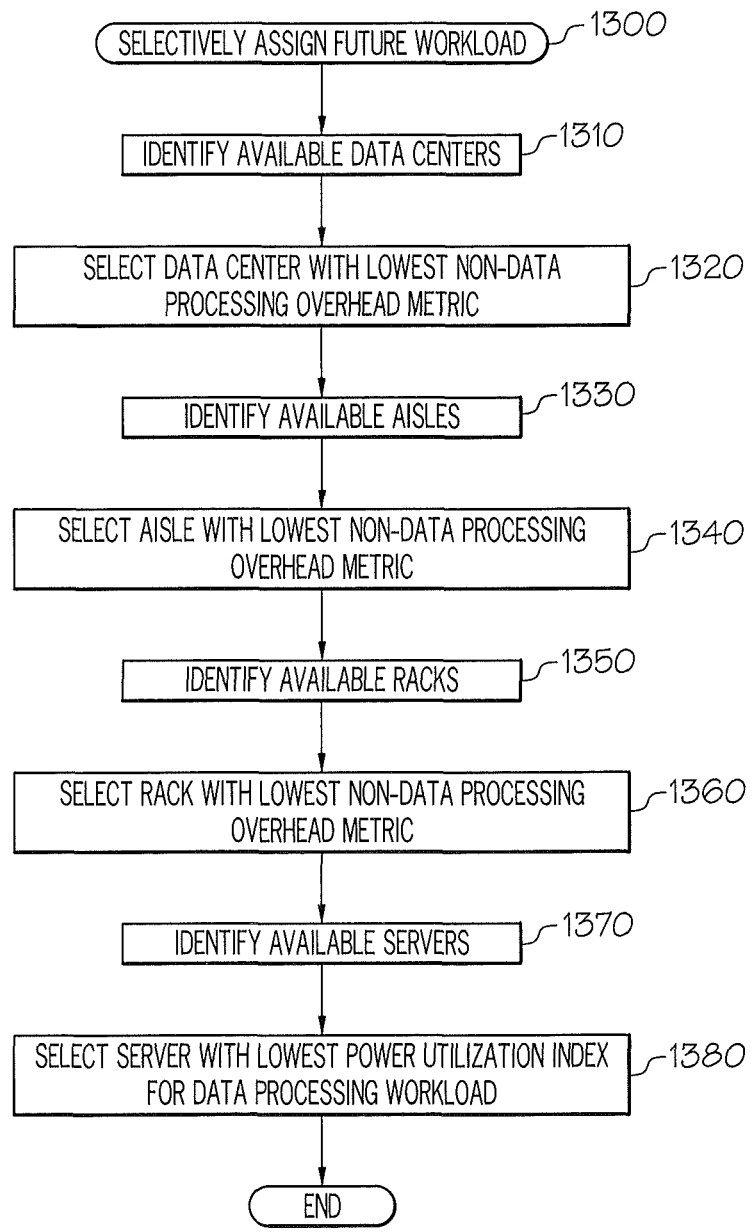

FIG. 13 is a flowchart of operations that may be performed to selectively assign future workload according to other embodiments described herein. In embodiments of FIG. 13, a top-down assignment is performed by selecting a data center 100, an aisle 130 within the data center, a rack 120 within the aisle, and a server 110 within the rack.

More specifically, referring to FIG. 13, at Block 1310, a plurality of data centers 100 are identified that are available, i.e., that have capacity, to perform the future workload. At Block 1320, a data center 100 from among the plurality of available data centers is selected having a low or lowest non-data processing overhead metric, i.e., a lowest $\Delta DC\_ITPU$ (Equation 8). At Block 1330, aisles 130 within the selected data center 100 are identified that are available to perform the future workload. At Block 1340, an aisle is selected from among the available aisles that are identified, having a low or the lowest non-data processing overhead metric, i.e. with a low or the lowest $\Delta Aisle\_PU$ (Equation 6). At Block 1350, a plurality of racks 120 in the selected aisle 130 are identified that have capacity to perform the future workload. At Block 1360, a rack 120 is selected from the available racks, having a low or the lowest non-data processing overhead metric, i.e., the lowest $\Delta RackPU$ (Equation 4). At Block 1370, servers 110 within the identified rack 120 that are available to perform the future workload are identified. At Block 1380, assume that a $\Delta PU$ is not available for the servers, because these individual power consumption measurements are not available at the server level. Then, an available server 110 with a low or the lowest power utilization index for the data processing workload is selected. Accordingly, embodiments of FIG. 13 use the metrics of power consumed for non-data processing overhead to select a data center 110, aisle 130 and rack 120, and then use a power utilization index that defines an amount of power that is consumed for a unit of workload performed by a server 110 to select a server 110 in the rack 120.

It will also be understood that other embodiments of FIG. 13 may begin at the aisle 130 or rack 120 level rather than at the data center 100 level, and may combine metrics of power that is consumed by a data center, aisle, rack and/or server, to perform both data processing tasks and non-data processing overhead. It will also be understood that various embodiments of FIG. 13 provided a "top down" assignment from data center to aisle to rack and to server. In other embodiments, the selective assignment may be performed only at a single level. For example, an available rack may be found with a low or the lowest non-IT overhead, regardless of the aisle in which it is located. Alternatively, an available aisle may be found with a low or the lowest non-IT overhead regardless of the data center in which it is located. Stated differently, the assignment may find a low or lowest available non-IT overhead rack, even if it is not located in a low or lowest available non-IT overhead aisle or in a low or lowest available non-IT overhead data center.

Moreover, according to any of the embodiments described herein, the selective assignment at Blocks 1140, 1160, 1180, 1200 and/or 1300 may comprise predicting future power usage by a server, rack, aisle and/or data center based on the metric of power consumed by the server, rack, aisle and/or data center for the non-data processing overhead that was described above. The prediction may be performed on an hourly, daily and/or other basis, and, in some embodiments, may be based on a moving average of past data at different levels similar to the manner that was graphically illustrated in FIG. 9.

Accordingly, various embodiments described herein can allow efficiency to be discovered at different levels: rack, aisle, and data center. Objective techniques have been described to measure the aisle and rack level placement efficiency. Thus, according to various embodiments described herein, before placing a job (transaction and/or batch), priority may be given to efficient racks first for better throughput. The same behavior can be extended to aisle and data center level placement of jobs. In some embodiments, regression analysis may be used against data that is collected by DCIM/ecoMeter and/or other monitoring systems on a server, rack, aisle and data center level, by directly measuring energy used in a time period while workload is being executed. A model of an energy profile for a monitored unit may be built, so as to create a formula that allows an estimate of total energy use of a server, rack, aisle or data center as a function of processing workload. Power utilization for a future time frame, such as a next hour, may be predicted, for example based on a moving average of past data at a rack, aisle and/or server level.

Embodiments of the present disclosure were described herein with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

What is claimed is:

1. A method comprising:
    for each respective rack of a plurality of racks each comprising a plurality of servers:
        predicting, by a data processing apparatus, power consumption of the respective rack based on data processing demands that are placed on the plurality of servers of the respective rack for a given data processing workload by:
            determining a normalized respective power utilization index defining an amount of energy that is consumed by a respective one of the plurality of servers in the respective rack for each of the respective ones of the plurality of servers in the respective rack for a unit of workload performed by the respective one of the plurality of servers in the respective rack by:
                obtaining, via a user interface of the data processing apparatus connected via a network to the respective one of the plurality of servers, measurements of power consumed by the respective one of the plurality of servers in response to a plurality of workloads and measurements of workload demand placed on the respective one of the plurality of servers for the plurality of workloads;
                storing the measurements of power and measurements of workload demand in a memory of the data processing apparatus; and
                determining the normalized respective power utilization index for the respective one of the plurality of servers based on regression analysis of the measurements of power consumed and/or the measurements of workload demand and storing the normalized respective power utilization index in the memory;
            predicting respective power consumption of the plurality of servers in the respective rack for the future data processing workload, based on the normalized respective power utilization indexes for the plurality of servers in the respective rack; and
            predicting power consumption of the respective rack based upon the respective power consumption of the respective plurality of servers in the respective rack;
        measuring, by the data processing apparatus, power consumed by the respective rack when the plurality of servers is performing the given data processing workload;
        deriving, by the data processing apparatus, a metric of power consumed by the respective rack for non-data processing overhead based on a difference between results of the predicting and the measuring;
        determining, by the data processing apparatus, an availability for processing a future workload by the respective rack based on the metric of power consumed by the respective rack for the non-data processing overhead; and
    configuring the data processing apparatus, based on the availability, to:
        identify a plurality of racks among the plurality of racks that have the availability;
        select a rack of the plurality of racks that have the availability and based on the metric of power consumed by the rack for the non-data processing overhead and a time period that reduces a cost of power consumed by the rack;
        select a server in the rack from among the plurality of servers of the rack that reduces the overall power consumed for the non-data processing overhead in processing the future workload;
        transmit a command to the rack to process the future data processing workload by the selected server in the rack; and
        receive an indication that the rack is processing the workload at the time period that reduces the cost of power consumed by the rack.

2. The method according to claim 1 further comprising:
    performing the predicting, the measuring and the deriving for an aisle that comprises a plurality of racks including the rack, to derive a metric of power consumed by the aisle for the non-data processing overhead that is based on a difference between the results of the predicting and the measuring for the aisle; and
    wherein configuring the data processing apparatus further comprises configuring the data processing apparatus to selectively assign the future data processing workload to the aisle based on the metric of power consumed by the aisle for the non-data processing overhead.

3. The method according to claim 2 further comprising:
    performing the predicting, the measuring and the deriving for a data center that comprises a plurality of aisles including the aisle, to derive a metric of power consumed by the data center for the non-data processing overhead; and
    wherein configuring the data processing apparatus further comprises configuring the data processing apparatus to selectively assign the future data processing workload to the data center based on the metric of power consumed by the data center for the non-data processing overhead that is based on a difference between the results of the predicting and the measuring for the data center.

4. The method according to claim 3 further comprising:
performing the predicting, the measuring and the deriving for a plurality of aisles in the data center that includes the aisle, to derive a respective metric of power consumed by a respective one of the plurality of aisles;
wherein configuring the data processing apparatus to selectively assign the future data processing workload to the data center further comprises configuring the data processing apparatus to selectively assign the future data processing workload among the plurality of aisles in the data center based upon the respective metric of power consumed by the respective one of the plurality of aisles for the non-data processing overhead.

5. The method according to claim 3 further comprising:
performing the predicting, the measuring and the deriving for a plurality of data centers including the data center, to derive a respective metric of power consumed by a respective one of the plurality of data centers;
wherein configuring the data processing apparatus to selectively assign the future data processing workload to the data center further comprises configuring the data processing apparatus to selectively assign the future data processing workload among a plurality of data centers including the data center based upon the respective metric of power consumed by the respective one of the plurality of data centers for the non-data processing overhead.

6. The method according to claim 2 further comprising:
performing the predicting, the measuring and the deriving for a plurality of racks in the aisle that includes the rack, to derive a respective metric of power consumed by a respective one of the plurality of racks in the aisle;
wherein configuring the data processing apparatus to selectively assign the future data processing workload to the aisle further comprises configuring the data processing apparatus to selectively assign the future data processing workload among the plurality of racks in the aisle based upon the respective metric of power consumed by the respective one of the plurality of racks in the aisle for the non-data processing overhead.

7. The method according to claim 1 wherein configuring the data processing apparatus to selectively assign the future data processing workload to the rack further comprises configuring the data processing apparatus to selectively assign the future data processing workload among the plurality of racks to reduce overall power consumed by the plurality of racks for the non-data processing overhead.

8. The method according to claim 1 wherein configuring the data processing apparatus to selectively assign the future data processing workload to the rack further comprises configuring the data processing apparatus to selectively assign the future data processing workload in a time frame that reduces a cost of the power consumed by the plurality of racks for the non-data processing overhead.

9. The method according to claim 1, further comprising:
configuring the data processing apparatus to selectively assign the future data processing workload to a server in the rack based upon a power utilization index for a respective one of the plurality of servers in the rack, that defines an amount of energy that is consumed by the respective one of the plurality of servers in the rack, for a unit of workload performed by the respective one of the plurality of servers in the rack.

10. The method according to claim 1 wherein configuring the data processing apparatus to selectively assign the future data processing workload to the rack further comprises configuring the data processing apparatus to selectively assign the future data processing workload to the rack based upon the metric of power consumed by the rack for the non-data processing overhead and further based upon availability of the rack to perform the future data processing workload.

11. The method according to claim 1 wherein configuring the data processing apparatus to selectively assign the future data processing workload to the rack comprises configuring the data processing apparatus to predict future power usage by the rack, based on the metric of power consumed by the rack for the non-data processing overhead.

12. The method according to claim 1 wherein obtaining, via the user interface of the data processing apparatus through the network, measurements of workload demand placed on the respective one of the plurality of servers for the plurality of workloads comprises:
obtaining, via the user interface of the data processing apparatus through the network, measurements of workload demand placed on a processor subsystem of the respective one of the plurality of servers for the plurality of workloads;
obtaining, via the user interface of the data processing apparatus through the network, measurements of workload demand placed on a memory subsystem of the respective one of the plurality of servers for the plurality of workloads;
obtaining, via the user interface of the data processing apparatus through the network, measurements of workload demand placed on a network communication subsystem of the respective one of the plurality of servers for the plurality of workloads; and
obtaining, via the user interface of the data processing apparatus through the network, measurements of workload demand placed on a storage subsystem of the respective one of the plurality of servers for the plurality of workloads.

13. The method according to claim 12, wherein determining the normalized respective power utilization index for the respective one of the plurality of servers based on regression analysis of the measurements of power consumed and/or the measurements of workload demand comprises determining power consumption coefficients of the processor subsystem, the memory subsystem, the network interface subsystem, and the storage subsystem.

14. A computer program product comprising:
a non-transitory computer readable storage medium comprising computer readable program code embodied in the medium that when executed by at least one processor of a computer system causes the computer system to perform operations comprising:
for each respective rack of a plurality of racks each comprising a plurality of servers:
predicting power consumption of the respective rack based on data processing demands that are placed on the plurality of servers for a given data processing workload by:
determining a normalized respective power utilization index defining an amount of energy that is consumed by a respective one of the plurality of servers in the respective rack for each of the respective ones of the plurality of servers in the respective rack for a unit of workload performed by the respective one of the plurality of servers in the respective rack by:
obtaining, via a user interface of the data processing apparatus connected via a network to the respective one of the plurality of servers, measurements of power consumed by the respective one of the plurality of servers in response to a plurality of workloads and measurements of workload demand placed on the respective one of the plurality of servers for the plurality of workloads;

storing the measurements of power and measurements of workload demand in a memory of the data processing apparatus; and determining the normalized respective power utilization index for the respective one of the plurality of servers based on regression analysis of the measurements of power consumed and/or the measurements of workload demand and storing the normalized respective power utilization index in the memory;

predicting respective power consumption of the respective ones of the plurality of servers in the respective rack for the future data processing workload, based on the normalized respective power utilization indexes for the plurality of servers in the respective rack; and predicting power consumption of the respective rack based upon the respective power consumption of the plurality of servers in the respective rack;

measuring, by the data processing apparatus, power consumed by the respective rack when the plurality of servers is performing the given data processing workload;

deriving, by the data processing apparatus, a metric of power consumed by the respective rack for non-data processing overhead based on a difference between results of the predicting and the measuring;

determining, by the data processing apparatus, an availability for processing a future workload by the respective rack based on the metric of power consumed by the respective rack for the non-data processing overhead; and configuring the data processing apparatus, based on the availability, to:

identify a plurality of racks among the plurality of racks that have the availability;

select a rack of the plurality of racks that have the availability and based on the metric of power consumed by the rack for the non-data processing overhead and a time period that reduces a cost of power consumed by the rack;

select a server in the rack from among the plurality of servers of the rack that reduces the overall power consumed for the non-data processing overhead in processing the future workload;

transmit a command to the rack to process the future data processing workload by the selected server in the rack; and receive an indication that the rack is processing the workload at the time period that reduces the cost of power consumed by the rack.

15. The computer program product according to claim 14 further comprising:

performing the predicting, the measuring and the deriving for an aisle that comprises a plurality of racks including the rack, to derive a metric of power consumed by the aisle for the non-data processing overhead that is based on a difference between the results of the predicting and the measuring for the aisle; and wherein configuring the data processing apparatus further comprises configuring the data processing apparatus to selectively assign the future data processing workload to the aisle based on the metric of power consumed by the aisle for the non-data processing overhead.

16. The computer program product according to claim 15 further comprising:

performing the predicting, the measuring and the deriving for a data center that comprises a plurality of aisles including the aisle, to derive a metric of power consumed by the data center for the non-data processing overhead; and wherein configuring the data processing apparatus further comprises configuring the data processing apparatus to selectively assign the future data processing workload to the data center based on the metric of power consumed by the data center for the non-data processing overhead that is based on a difference between the results of the predicting and the measuring for the data center.

17. A computer system comprising:

a processor; and a workload assigning system that runs on a processor, the workload assigning system configured to perform operations to:

for each respective rack of a plurality of racks each comprising a plurality of servers:

predict power consumption of the respective rack based on data processing demands that are placed on the plurality of servers of the respective rack for a given data processing workload by:

determining a normalized respective power utilization index defining an amount of energy that is consumed by a respective one of the plurality of servers in the respective rack for each of the respective ones of the plurality of servers in the respective rack for a unit of workload performed by the respective one of the plurality of servers in the respective rack by:

obtaining, via a user interface of the data processing apparatus connected via a network to the respective one of the plurality of servers, measurements of power consumed by the respective one of the plurality of servers in response to a plurality of workloads and measurements of workload demand placed on the respective one of the plurality of servers for the plurality of workloads;

storing the measurements of power and measurements of workload demand in a memory of the data processing apparatus; and determining the normalized respective power utilization index for the respective one of the plurality of servers based on regression analysis of the measurements of power consumed and/or the measurements of workload demand and storing the normalized respective power utilization index in the memory;

predicting respective power consumption of the respective ones of the plurality of servers in the respective rack for the future data processing workload, based on the normalized respective power utilization indexes for the plurality of servers in the respective rack; and predicting power consumption of the respective rack based upon the respective power consumption of the plurality of servers in the respective rack;

measure power consumed by the respective rack when the plurality of servers is performing the given data processing workload;

derive a metric of power consumed by the respective rack for non-data processing overhead based on a difference between results of the predicting and the measuring;

determine an availability for processing a future workload by the respective rack based on the metric of power consumed by the respective rack for the non-data processing overhead; and identify a plurality of racks among the plurality of racks that have the availability;

select a rack of the plurality of racks that have the availability and based on the metric of power consumed by the rack for the non-data processing overhead and a time period that reduces a cost of power consumed by the rack;

select a server in the rack from among the plurality of servers that reduces the overall power consumed for the non-data processing overhead in processing the future workload;

transmit a command to the rack to process the future data processing workload by the selected server in the rack; and receive an indication that the rack is processing the workload at the time period that reduces the cost of power consumed by the rack.

18. The computer system according to claim 17 further comprising:

performing the predicting, the measuring and the deriving for an aisle that comprises a plurality of racks including the rack, to derive a metric of power consumed by the aisle for the non-data processing overhead that is based on a difference between the results of the predicting and the measuring for the aisle; and wherein configuring the data processing apparatus further comprises configuring the data processing apparatus to selectively assign the future data processing workload to the aisle based on the metric of power consumed by the aisle for the non-data processing overhead.

* * * * *